INVENTORS.
STANLEY A. CORTRIGHT
STUART M. DOCKERTY
KENNETH T. OVERMAN
WILLIAM F. PARDUE, JR.
GEORGE C. SHAY

July 7, 1970   S. A. CORTRIGHT ETAL   3,519,411
METHOD AND APPARATUS FOR SUPPORTING SHEET GLASS FORMING DEVICE
Filed Dec. 28, 1966   2 Sheets-Sheet 2
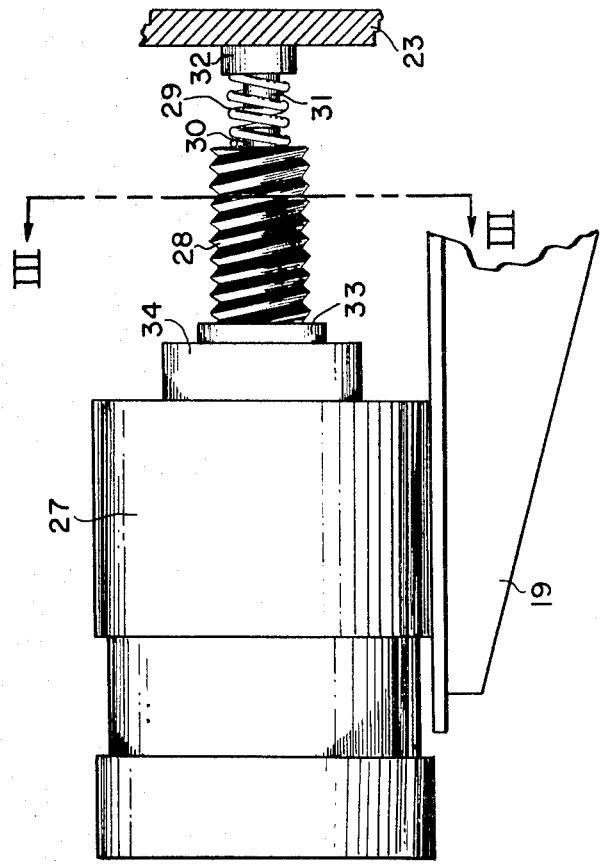
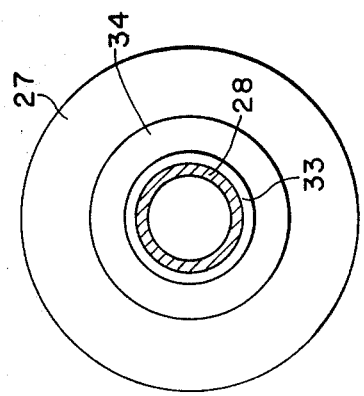
INVENTORS.
STANLEY A. CORTRIGHT
STUART M. DOCKERTY
KENNETH T. OVERMAN
WILLIAM F. PARDUE, JR.
GEORGE C. SHAY
BY *Burley R. Turner*
ATTORNEY

United States Patent Office 3,519,411
Patented July 7, 1970

3,519,411
METHOD AND APPARATUS FOR SUPPORTING SHEET GLASS FORMING DEVICE
Stanley A. Cortright and Stuart M. Dockerty, Corning, Kenneth T. Overman, Painted Post, and William F. Pardue, Jr., and George C. Shay, Corning, N.Y., assignors to Corning Glass Works, Corning, N.Y., a corporation of New York
Filed Dec. 28, 1966, Ser. No. 605,352
Int. Cl. C03b 5/26
U.S. Cl. 65—90                                                3 Claims

ABSTRACT OF THE DISCLOSURE

Refractory overflow devices for forming sheet glass are subject to tensile stresses, particularly in the lower central section thereof, due to the combined weight of the forming device and the glass retained thereby. The present invention comprises the axial or longitudinal compressive loading of a refractory sheet glass forming device by means of an air cylinder or the like applying a desired force thereon through pressure and backup plates so as to take advantage of the high compression strength of refractory while avoiding its natural weakness in tension.

BACKGROUND OF THE INVENTION

In the manufacture of sheet glass by the overflow down-draw process, molten glass flows downwardly along opposite sides of an end-supported refractory forming member and such flows unite at an unsupported bottom portion of such member to form sheet glass. In view of the nature of the process, it is impossible to support the bottom portion of the forming member over a length equal to the width of sheet to be formed, since such bottom section must be free to allow the desired sheet width to flow therefrom in an unobstructed manner. Accordingly, the central lower portions of the forming member are subjected to undesirable tensile stresses, occasioned not only by the weight of the forming member itself but also the weight of the glass flowing thereover, which stresses if not compensated could result in the failure of the refractory forming member.

DESCRIPTION OF THE PRIOR ART

In the past, attempts have been made to alleviate the possibility of refractory failure by embedding a fixed support beam within the forming device, such as shown in Ferngren Pat. 1,829,641. However, this approach has not been completely satisfactory, since the fixed beam, supported at each end, necessarily has a different coefficient of expansion than the refractory material in which it is embedded. Accordingly, the coefficient of expansion differential between the support beam and the refractory had a tendency to induce other undesirable stresses particularly during heat up and cool down. Further, the metallic support beam was subject to creep and other high temperature deformation, which rendered such rigid support a rather questionable safety device.

SUMMARY OF THE INVENTION

Basically, the present invention takes advantage of the high compression strength of refractory material while avoiding its natural weakness in tension by applying an external axial compressive force or load to the refractory forming member. An air cylinder supplied with regulated air in the usual manner, or other suitable device applies a constant force to a movable support block or pier supporting one end of the forming member, while the pier supporting the opposite end is retained in a stationary position by a backing member or block. The force-applying cylinder permits the refractory forming member to expand and contract thermally while maintaining a constant predetermined force thereon. The compressive force is imparted by the cylinder through the backing plates to the forming member in an axial direction extending along the longitudinal extent of such member between its end support blocks. Normally, such force is applied parallel to the bottom edge or root of the forming member, and eliminates undesirable tensile stresses in such member.

It thus has been an object of the present invention to alleviate the undesirable effects of tensile stresses in a refractory sheet glass forming member by supplying an axial or longitudinal compressive load thereon.

An additional object of the invention has been to provide a downdraw sheet glass refractory forming member with a predetermined axial compressive force which remains constant over the entire forming operation including heat up and cool down.

A further object of the invention has been to provide a piston-cylinder means for applying a compressive force to an end-supported sheet glass-forming refractory member, wherein the piston-cylinder means is provided with a fail-safe mechanism to maintain a compressive load on the refractory member, should there be a power failure to the piston-cylinder means.

BRIEF DESCRIPTION OF THE DRAWINGS

These and other objects will become apparent to those skilled in the art from the following disclosure and accompanying drawings in which:

FIG. 2 is a side elevational view of the piston-cylinder means showing the fail-safe or safety mechanism attached thereto.

FIG. 3 is a sectional view in elevation taken along line III—III of FIG. 2.

DESCRIPTION OF THE PREFERRED EMBODIMENTS

Figure 1:
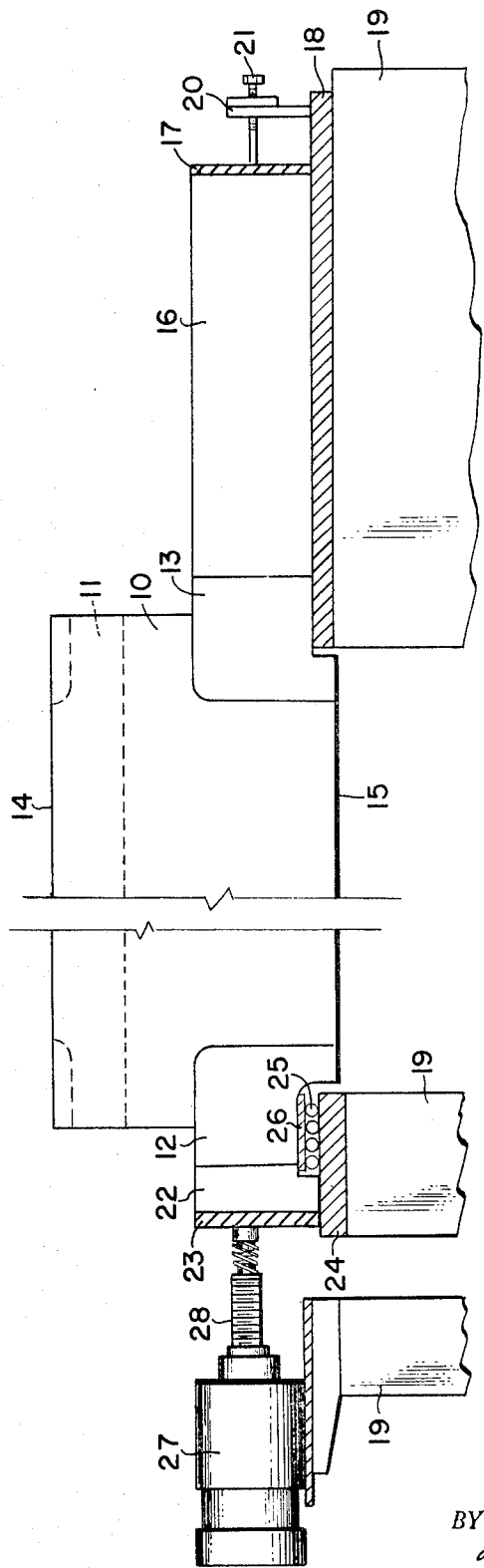
FIG. 1 is a somewhat schematic elevational view of a compression loading apparatus embodying the present invention.

Referring now to the drawings, and particularly FIG. 1, a refractory sheet glass forming member 10 having an overflow channel 11 is shown resting upon a movable pier or support block 12 and a stationary pier or support block 13. Normally the forming member 10 is in the shape of a wedge with the overflow channel 11 being at the upper thicker portion of the wedge and supplying molten glass to a central upwardly open overflow surface 14, from a source provided at either one or both ends of the channel. The molten glass then flows downwardly along opposite sides of the wedge-shaped forming member 10 and unites into a single sheet of glass at a lower unsupported edge or root 15 of the forming member 10. The maximum width of the sheet glass which may be drawn from the member 10 is limited by the length of the unsupported lower edge 15 from which the sheet glass is drawn.

In order to maximize the width of sheet glass which may be drawn from the forming member, as represented by the length of the unsupported edge, it is necessary to compensate for and eliminate the tensile stresses which occur in the central bottom portion of the forming member and may result in the failure thereof. By applying an axial compressive load on the forming member we have been able to eliminate the undesirable effect of the tensile stresses. It is now possible to safely increase the width of the refractory forming member, as represented by the length of unsupported lower edge 15, to provide sheet glass having improved width.

The axial load is imparted to the refractory forming member 10 between movable support block 12 and stationary support block 13. Support block 13 is held longitudinally stationary by refractory block material 16 and end plate 17. The stationary pier 13 and refractory block material 16 are supported by a metallic plate member 18 attached to framework 19. A bolt adjustment assembly 20 is also secured to support plate member 18 and has a threadably adjustable bolt 21 which engages end plate 17. Bolt adjustment assembly 20 compensates for any changes in dimension of the refractory block material 16 and/or the external framework, so that the support pier 13 may be maintained in a stationary or fixed position.

The movable pier 12 is backed by refractory insulating brick 22 and a movable backing plate 23. The support block 12, insulating brick 22 and movable back plate 23 are supported by an abrasion-resistant metallic plate member 24 which is also attached to framework 19. In order to reduce friction, a plurality of rollers 25 and a wear plate 26 support movable pier 12.

The desired axial force on the forming member 10 is preferably provided by an air cylinder 27 having a threaded piston rod 28 which exerts a force on backing plate 23, insulating brick 22, and movable support block 12, which force is transmitted to the refractory forming member 10. We have found that an air cylinder having an 8-inch diameter will supply a more than adequate force of 2,000 pounds with a regulated air pressure supply of only 40 p.s.i. The air cylinder 27, which is shown mounted on the external framework 19, provides a constant force on the movable backing plate 23, which force is transmitted to the forming member 10 regardless of the lateral position of the backing plate, within the limits of the travel of piston 28 in the cylinder 27. Accordingly, the force applied to the backing plate 23 will be constant even during the expansion and contraction of the refractory forming member which may be occasioned during heat up and cool down operations.

When the refractory forming member 10 is initially heated during the heat up process, it will expand along its longitudinal extent. However, since supporting pier 13 is held stationary, any expansion occasioned by the forming member 10 will be exerted against movable pier 12. Therefore the force exerted between movable pier 12 and the forming member 10 at such time will be the force exerted by the cylinder 27, plus the sliding friction between pier 12 and its support plate 24. When the refractory member 10 is being cooled, on the other hand, it will contract and tend to urge movable support pier 12 toward stationary pier 13. Therefore the force between movable support pier 12 and the refractory member 10 at such time will be the force exerted by the cylinder 27 less the frictional force between pier 12 and its supporting plate 24.

Since it is desirable to have the force exerted on the forming member 10 by the movable pier 12 constant, the frictional force between the movable pier and its supporting plate 24 should be as low as possible. For all practical purposes, therefore, sliding friction has been essentially eliminated by the insertion of rollers 25 and wear plate 26 between movable pier 12 and its support plate member 24. By properly adjusting the axial forces on the forming member 10, undesirable tensile stresses can be eliminated.

Referring now particularly to FIGS. 2 and 3, a safety feature of the present invention is shown which fails safe and prevents the loss of axial force on the forming member in the event of the failure in the air supply to the cylinder 27. As shown, the force exerted by piston 28 is applied to backing plate 23 through a spring 29. The spring 29 is held in position at its rearward end by an extension plug 30 secured to the nose of threaded piston rod 28, and its forward end by a guide portion 31 on a pressure pad 32 which engages the backing plate 23. A locknut 33 is threadably positioned on the piston rod 28 in close proximity to a safety stop abutment portion 34 formed on the forward end of cylinder 27. In order for the air cylinder 27 to apply a force to backing plate 23, it is necessary to compress the spring 29 between the nose of the threaded piston rod 28 and the pressing pad 32. If the supply of air were then to fail, the force stored in the compressed spring 29 would tend to force the piston rod 28 backwardly into the cylinder 27. However, the rearward motion of the piston rod will be restrained by the locknut 33 which is threaded thereon, as it engages the safety stop abutment portion 34.

In practice, by periodically checking the position of locknut 33, it is maintained at a constant predetermined position from the safety stop 34. When the locknut is positioned at .010 inch from the safety stop, it limits the travel of the piston rod to a maximum retraction distance of .010 inch. Using a spring having a spring rate of 3,893 pounds per inch of deflection, this means that an air supply failure would result in a decrease in load on the backing plate 23 of only 39 pounds, to wit: 3893#/in. x .010 inch.

It thus can be seen that the present invention not only accomplishes the desired result of eliminating undesirable tensile stresses in refractory sheet glass forming members, but also provides unique method and apparatus for accomplishing such result including a fail-safe safety feature. Although a preferred embodiment of the invention has been set forth in detail it will become apparent to those skilled in the art that various changes and modifications may be made thereto including the application of a constant force by means of (1) counterweights and levers, or (2) a hydraulic cylinder with pressure control.

We claim:

1. In the process of forming sheet glass by the downdraw method wherein molten glass flows downwardly along opposite sides of a longitudinal refractory forming member and is withdrawn from a bottom unsupported edge thereof in a single continuous sheet, an improved method of eliminating undesirable tensile stresses in the forming member which comprises, initially applying a predetermined compressive force of a magnitude sufficient to compensate for undesirable tensile stresses on said forming member and in an axial direction along the longitudinal extent of such member to produce an equal and opposite force thereon, regulating such application of force to compensate for expansion and contraction of said forming member and thereby maintain said predetermined compressive force with a substantially constant magnitude, and applying a secondary force to said forming member of lesser magnitude than the predetermined compressive force which would be effective, should the predetermined force fail.

2. In apparatus for downwardly drawing sheet glass by the downdraw process wherein a longitudinal refractory forming member having converging sidewall portions fed with molten glass from an upwardly open overflow channel and an unsupported bottom edge for withdrawing sheet glass therefrom, is supported externally at its opposite longitudinal ends, the improvement comprising a movable pier supporting one end of said forming member, a stationary pier supporting the opposite end thereof, rolling means for supporting said movable pier to reduce friction during movement thereof, and cylinder means for providing a constant predetermined force to the movable end of said forming member in an axial direction along the longitudinal extent thereof and substantially parallel to said unsupported bottom edge to eliminate undesirable tensile stresses in said refractory member.

3. In apparatus for downwardly drawing sheet glass by the downdraw process wherein a longitudinal refractory forming member having converging sidewall portions fed with molten glass from an upwardly open overflow channel and an unsupported bottom edge for withdrawing sheet glass therefrom, is supported externally at its opposite longitudinal ends, the improvement comprising movable support means at one longitudinal end of said forming member and stationary support means at the opposite end thereof, cylinder means for providing a constant predetermined force to the movable end of said forming member in an axial direction along the longitudinal extent thereof to eliminate undesirable tensile stresses in said refractory member, said cylinder means including a fail-safe mechanism comprising a threaded piston rod operated by said cylinder means, a compression spring for transmitting the force from said piston rod to said forming member, and a locknut positioned on said threaded piston rod to limit its retraction within said cylinder means should there be a failure of the energizing power supplied thereto, so that a secondary force may be maintained on said forming member by means of said compression spring.

References Cited

UNITED STATES PATENTS

| 1,622,346 | 3/1927 | Rotheram et al. | 65—171 X |
| 3,294,514 | 12/1966 | Zellers | 65—339 X |

ARTHUR D. KELLOGG, Primary Examiner

U.S. Cl. X.R.

65—171, 341, 347